(12) United States Patent
Due

(10) Patent No.: US 6,219,962 B1
(45) Date of Patent: Apr. 24, 2001

(54) TUBULAR PLANT GUARDS

(76) Inventor: Graham Due, 28 Verdun Street, Beulah Park, South Australia 5067 (AU)

( * ) Notice: Subject to any disclaimer, the term of this patent is extended or adjusted under 35 U.S.C. 154(b) by 0 days.

(21) Appl. No.: 09/261,929

(22) Filed: Mar. 3, 1999

(30) Foreign Application Priority Data

Mar. 4, 1998 (AU) .................................................. PP2172

(51) Int. Cl.$^7$ .............................. A01G 13/02; B65D 5/04
(52) U.S. Cl. .................................................................. 47/30
(58) Field of Search ............................. 47/26, 30, 28.1, 47/29, 44, 45; 206/423

(56) References Cited

U.S. PATENT DOCUMENTS

| | | | |
|---|---|---|---|
| 884,473 | * | 4/1908 | Dawson . |
| 2,260,436 | * | 10/1941 | Chambers ................................. 47/30 |
| 2,340,373 | * | 2/1944 | Gardner ................................. 206/423 |
| 4,969,555 | | 11/1990 | Fitzgerald . |
| 5,347,750 | * | 9/1994 | Mills . |
| 5,809,690 | | 9/1998 | Due et al. . |
| 6,088,952 | * | 7/2000 | Wilson ..................................... 47/30 |

FOREIGN PATENT DOCUMENTS

| | | |
|---|---|---|
| 23516/92 | 11/1992 | (AU) . |
| 0 325 490 | * 7/1989 | (EP) . |
| WO 96/02125 | * 2/1996 | (WO) . |
| WO 97/03551 | * 2/1997 | (WO) . |
| WO 99/13704 | * 3/1999 | (WO) . |

* cited by examiner

*Primary Examiner*—Peter M. Poon
*Assistant Examiner*—Jeffrey L. Gellner

(57) ABSTRACT

A plant guard is made of a sheet of material which is formed into a tubular shape. Side marginal edges of the sheet are secured together by a fastener. A flap is formed at one end adjacent one side marginal edge, the flap being folded, in use, over a supporting wire so that the wire passes in front of and adjacent the engaged marginal edges to prevent disengagement thereof.

10 Claims, 4 Drawing Sheets

TUBULAR PLANT GUARDS

FIELD OF THE INVENTION

This invention relates to improvements in tubular plant guards and relates particularly to an improved plant guard for protection of small plants, such as newly planted vines, e.g. grape vines, trees or the like.

BACKGROUND OF THE INVENTION

It is common practice in vineyards, for example, to use an elongate hollow guard placed around a young vine at the time of its planting to protect it during its early growth period. One such guard is described in the specification of Australian Patent Application No. 23516/92. This guard comprises a panel of flexible material adapted to be formed into a tubular body and releasably fastened in a tubular condition by means of cooperating tabs and slots provided along the vertical edges of the panel which are to be joined together. This allows the guard to be supplied as a blank in a flat, unfolded condition and subsequently formed into the tubular shape by a folding and interlocking operation The guard disclosed in the specification has several disadvantages, including the difficulty of engaging the individual tabs into the appropriate slots. This is both time consuming and awkward particularly when the guard is of a length which makes it difficult to reach all tabs and slots.

U.S. Pat. No. 4,969,555 to Fitzgerald discloses another form of guard which uses fabric material having a plurality of sets of mating fasteners attached along opposite side edges thereof The material is placed around the base of a growing tree, and the bottom sets of mating fasteners are buckled around the trunk of the tree. Subsequently fasteners are in turn buckled which, in the case of a tree, progressively compresses the tree branches upwardly. This form of guard is relatively difficult to manufacture and requires substantial time and effort to engage in position.

U.S. Pat. No. 5,347,750 to Mills discloses plant protectors of a variety of forms including a form formed of extruded sheet material the opposite side edges of which are adapted to interlock. However, the edge portions of the panel material, in use, face in opposite directions and overly each other to enable one to be connected to the other. The join is, therefore, an overlapping join and disadvantage of this structure is the difficulty in interlocking the tab within the recess, particularly in the case of an elongated guard.

Another guard is described and illustrated in U.S. patent application No. 5,809,690. The guard of this patent is formed from a panel of plastics material which is folded into a tubular shape with adjacent vertical margins of the panel being connected together by means of a recallable zip type fastener which comprises fastener strips. Each strip has a locking profile portion which is adapt to releasably interlock with the locking profile portion of the other strip. The fastener strips arc secured to the opposite edge portions of the panel by heat welding or by means of an adhesive. The embodiments illustrated in the specification show the guard with an upstanding rear tab adapt to engage a wire of a wire trellis to secure the guard to the trellis.

The guards disclosed in the aforesaid prior patent specifications may be improved from the point of view of a user in terms of case and security of fasting together of the vertical margins of the guard panel. In particular, it has been found that the joining together of the vertical margins of the guard panel using cooperating tabs and slots is generally unsatisfactory in that the tabs, in some instances, become disengaged from their slots and gaps are created along the edges of the vertical margins. Such gaps allow entry points for chemical sprays such as herbicides, which can have a deleterious effect on a young plant.

It is also been found that the use of a zipper-type fastener as described in our U.S. Pat. No. 5,809,690 aforesaid, while a substantial improvement on tabs and slots and other fasteners for securing together the vertical margins of the guard panel, may also be unsatisfactory in some instances where pressure is exerted against the and of the fastener which may cause the fastener strips to disengage, particularly at the upper end. Thus, a vine within the guard may push against the upper edges of the fastener strips, or rest on the upper edges, and cause the strips to disengage.

SUMMARY OF THE INVENTION

It is therefore desirable to provide an improved plant guard which avoids the stated disadvantages of the prior guards.

It is also desirable to ode a plant guard having an improved structure but which is of simple construction and which allows the guard to be retained in its tubular shape quickly and simply.

It is also desirable to provide an improved plant guard which has a fastening means designed, when fastened, to in the fastened state, In accordance with one aspect of the invention there is provided a plant guard comprising a sheet of martial which is adapted to be formed into a tubular shape, the sheet having opposed marginal edges which, in the tubular shape, are adjacent, fastener means to fasten the marginal edges together, flap means at one end of the sheet and adapted to be folded over a substantially horizontally extending support means, said flap means being adjacent said marginal edges of said sheet when in the tubular shape, with the said marginal edges and associated fastener means adapted to engage behind said support means when said flap is folded thereover.

In one preferred embodiment, the sheet of material comprises a panel of synthetic plastic, hollow profile sheet, such as "CORFLUTE" (trade mark) which is an extruded, synthetic plastics sheet material having outer facing layers interconnected by a plurality of closely spaced, substantially parallel webs forming a series of elongate, internal channels or flutes extending along the length of the panel.

Preferably, the fastener means comprises interlockable resilient flexible fastener strips respectively secured to and extending along the opposed marginal edges, said fastener strips having locking profile ribs which interlock with one another so as to provide a reclosable, essentially zip-type fastener. Such a zip-type fastener is disclosed in U.S. Pat. No. 5,809,690 aforesaid. However, other fastener means, may be used in the performance of this invention.

If desired, the base of the plant guard may be provided with outwardly projecting flap portions each of which is hinged to a lower end of a tubular guard along a hinge line so that, in use, the flaps can be buried in the ground to provide a support base for the guard. Such a guard panel is disclosed in the earlier Australian Patent Application aforesaid.

When the guard in accordance with the present invention is retained in its assembled tubular shape by fastener means, and the flap means is engaged over the horizontally extending support means, which is preferably a trellis wire, the opposed marginal edges and associated fastener means are engaged behind the support wire thereby preventing the fastener means becoming disengaged at least at the upper end by application of accidental external forces or the like.

In order that the invention is readily understood, an embodiment thereof will now be described with reference to the accompanying drawings.

DESCRIPTION OF THE PREFERRED EMBODIMENT

Figure 1:
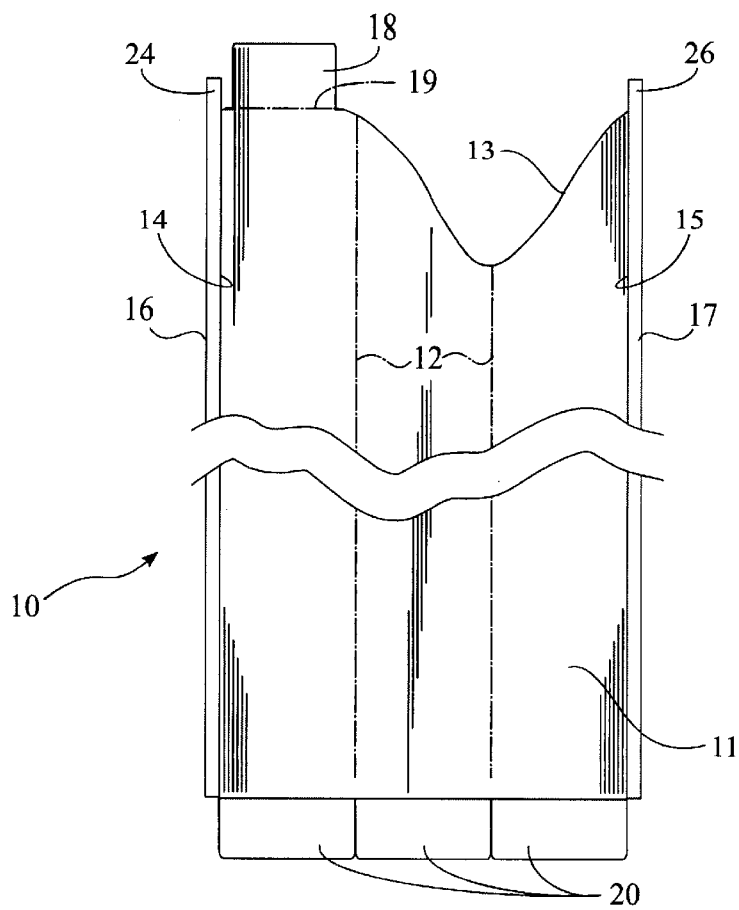
FIG. 1 is a plan view of a plant guard in its flat condition according to one embodiment of the invention

Referring to the drawings, there is shown a plant guard 10 produced form a sheet of synthetic plastic flute board material such as that sold under the trade mark "COR-FLUTE". This material, as indicated above, is an extruded synthetic plastics sheet material having spaced outer surfaces 31, 32 inter-connected by substantially parallel webs 33 (see FIG. 4) forming a plurality of elongate channels or flutes which extend the length of the sheet material. This material is well known and will not be described in detail.

Figure 2:
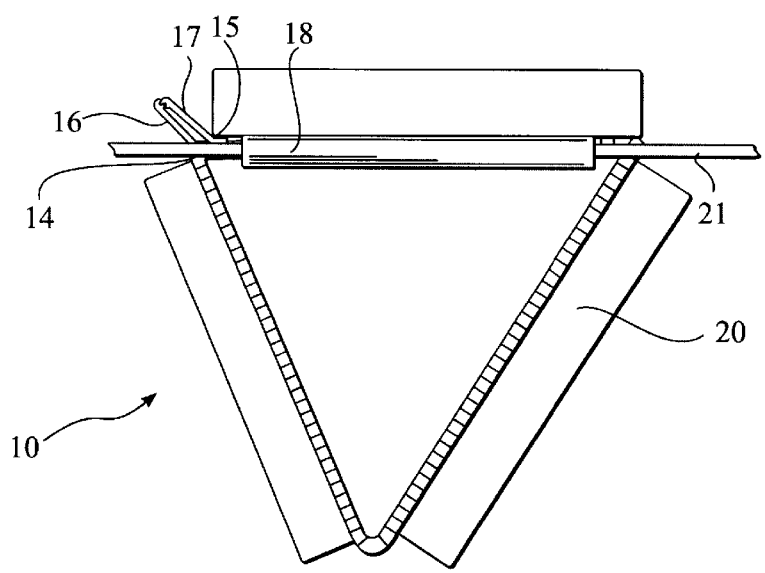
FIG. 2 is an and view of the guard shown in FIG. 1 in its folded, tubular shape and assembled to a trellis wire.
Figure 4:
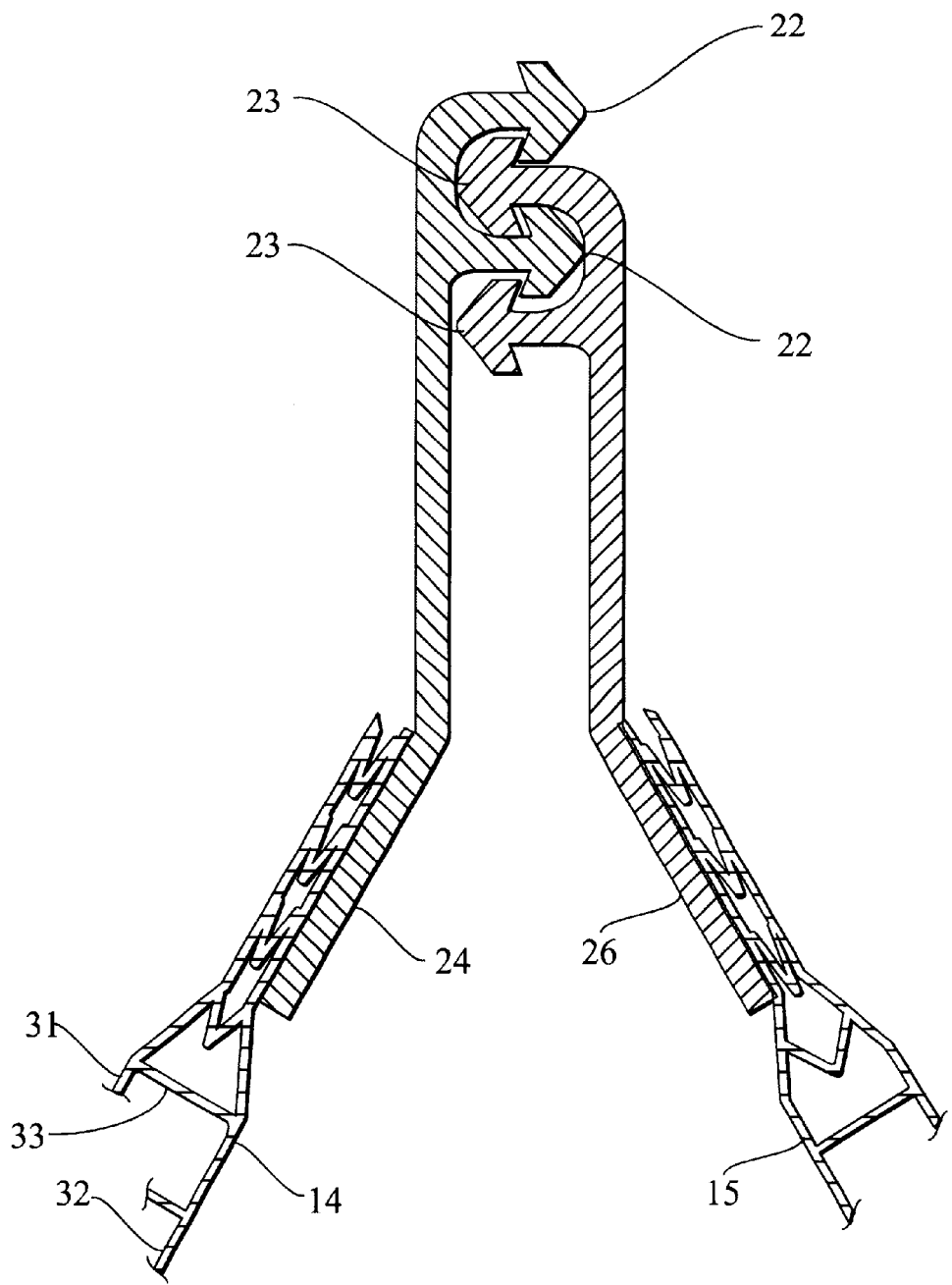
FIG. 4 is an enlarged plan view of the fastened edge portions locked behind a trellace wire.

The sheet of material is cut into a blank 11 of any suitable length with the core flutes running longitudinally as shown in FIGS. 2 and 4. A pair of lengthwise fold lines 12 allows the blank 11 to be folded into the tubular triangular shape as shown in FIG. 2. One end of the blank 11, which will form the upper end of the guard 10, has a cut away section 13 which tapers downwardly from the upper end of the blank 11 and is designed to allow vine shoots or runners from a vine (around which the guard is placed in use), to pass laterally outwards from the interior of the guard as the vine plant grows upwardly)

Opposed marginal edges 14 and 15, which extend longitudinally of the blank 11, have elongate fastener strips 16 and 17 secured thereto, as by adhesive, stitching, heat welding, mechanical attachment or other securing means. In this embodiment, the fastener strips 16 and 17 arc of the type as shown in FIG. 4. It will be appreciated, however, that other forms of fastener strips, may be used in the performance of this invention. Alternatively, the marginal edges 14 and 15 may be secured by interlocking tabs and slots, stitching, or by any other fastening means.

The end of the blank 11 between the edge of the cut away 13 and the marginal edge 14 is formed with a flap 18. A horizontal fold line 19 enables the flap 18 to fold downwardly coplanr with the side of the blank 11 which, in use, forms the back of the guard 10. It will be seen that the horizontal fold line 19 is located in such a position that, when he flap 18 is in its folded position, the upper ends of the marginal edges 14 and 15 and the attached fastener strips 16 and 17 extend beyond the folded flap 18.

As illustrated in FIGS. 1 and 2, at the opposing end of the blank 11 projecting flap portions 20 are hinged to the opposing end of the blank 11 so that when projected outwardly they provide support for the Guard 10.

Figure 3:
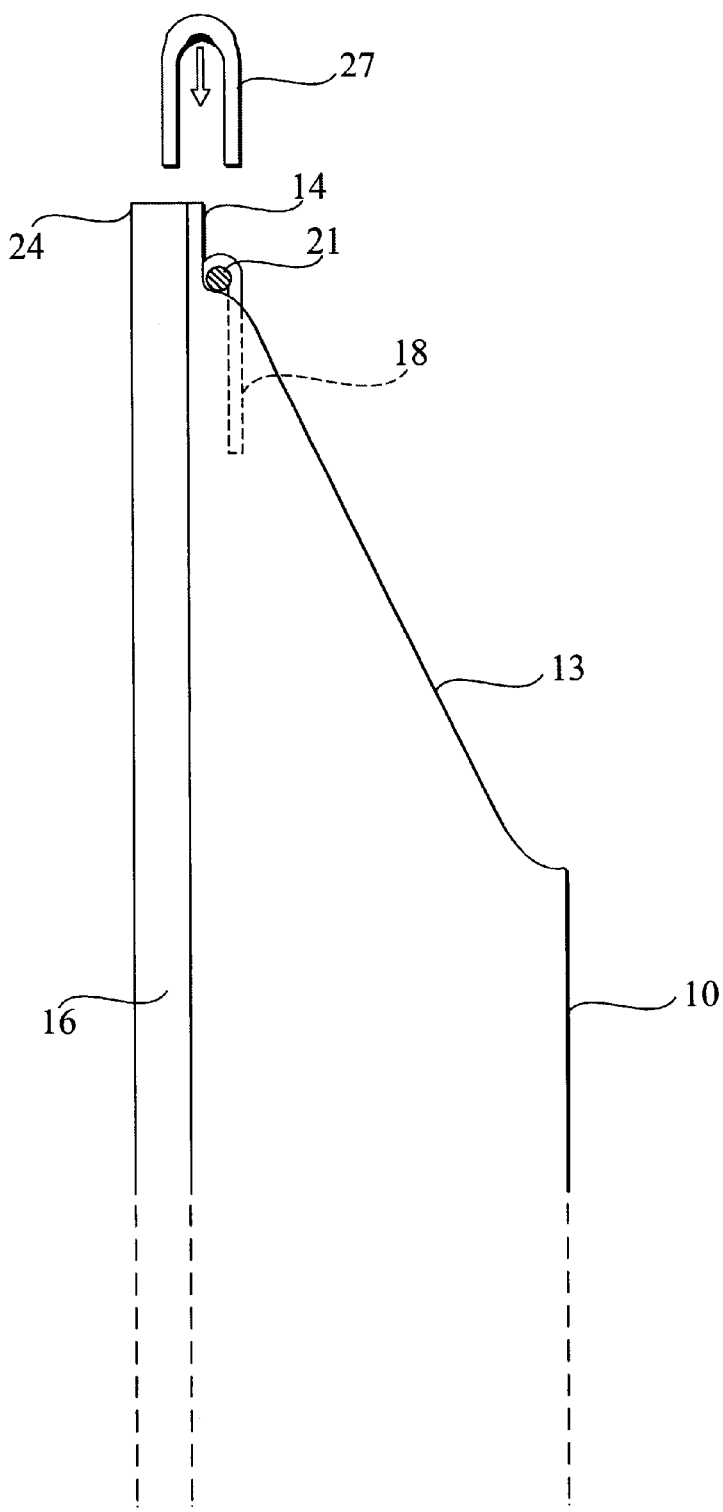
FIG. 3 is a side elevational view of the guard of FIG. 2.

FIGS. 2, 3 and 4 illustrate the guard 10 of this embodiment in use as attached to a trellis wire 21 commonly used in vineyards and the like to support the vines. The blank 11 is folded to the tubular guard ape which, in this embodiment, is triangular in cross section as shown in FIG. 2. It will be appreciated that any other cross sectional shapes may be used in the performance of this invention. In the folded position, the fastener strips 16 and 17 are interlocked by engaging interconnecting ribs 22 and 23 as described in the U.S. Pat. No. 5,809,690 aforesaid In the assembled condition, the guard 10 is located with the flap 18 and the engaged upper ends 24 and 26 of the fastener strips 16 and 17 behind the trellis wire 21 while the cut away sides of of the guard 10 extend forwardly of the wire 21. The flap 18 is folded forwardly over the wire as shown in FIG. 3, and is retained in the folded position by a U shaped clip 27.

It will be seen that, in the assembled condition as shown in FIGS. 2, 3 and 4, the upper ends 24 and 26 of the fastener strips 16 and 17 are locked together behind the trellis wire 21 by the folded flap 18. This, then, prevents the fastener strip 16 and 17 becoming disengaged at their upper ends 24 and 26. The locking of the fastener strips in the engaged condition provides substantial advantages over previous plant guards where fastener means have had a tendency to disengage in use, particularly when harshly treated by agricultural equipment and the like or when the vines grow and push out branches against the interlocked fastener strips 16 and 17, particularly at their upper ends 24 and 26.

The guard of the invention may be easily removed from engagement with a plant by relating the connection of the flap 18 with the trellis wire 21 and then disengaging the fastener strips 16 and 17 to enable the guard to be opened and removed from its engagement with a vine or young plant.

Figure 5:
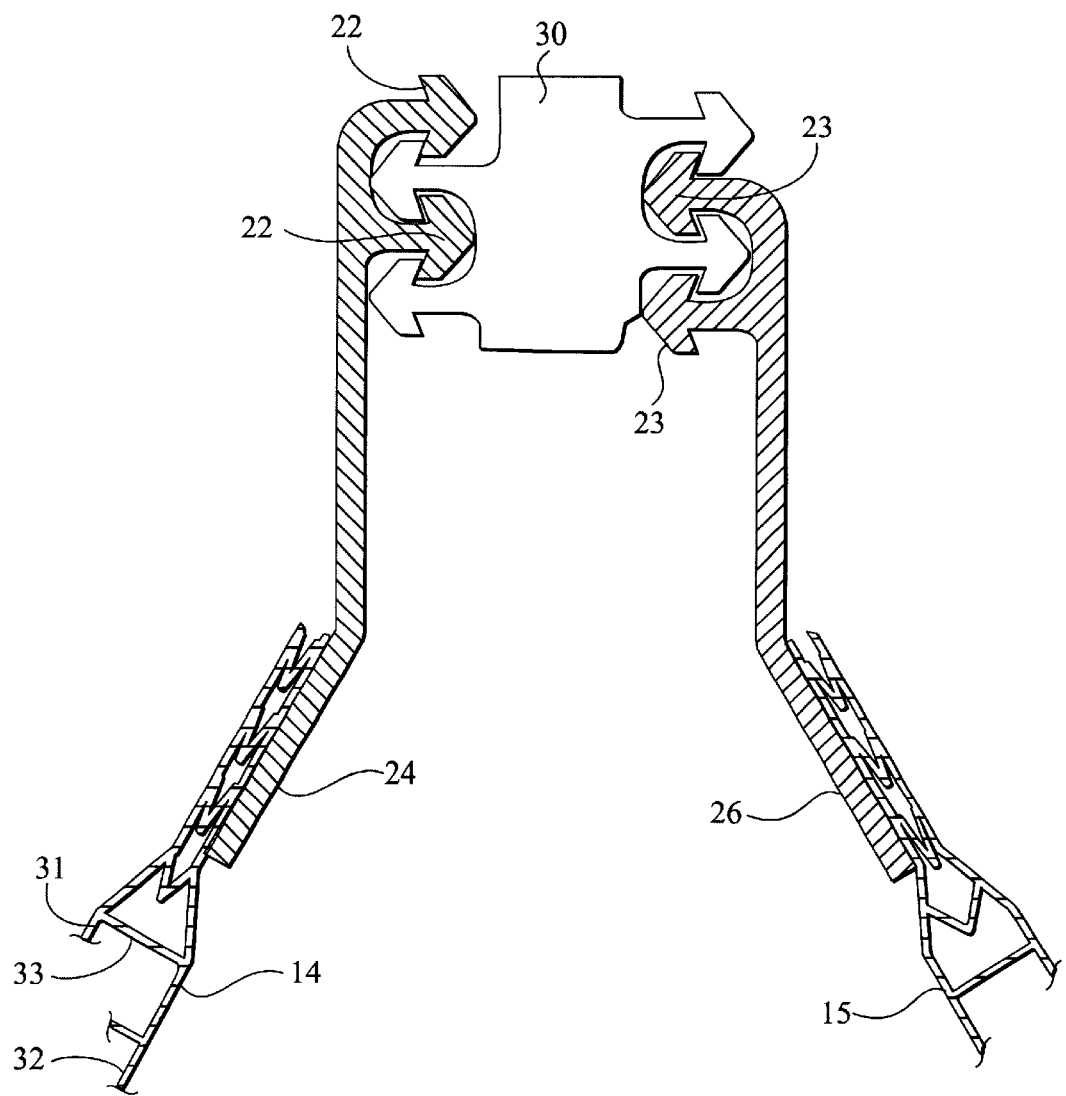
FIG. 5 is a plan view similar to that of FIG. 4 but illustrating a modification of the invention incorporating a stake.

The guard of the present invention may be incorporated with a vine stake 30 whereby the fastener strips, rather than fastening together, engage respective sides of the stake which is adapted to engage the ground. With this arrangement, the stake 30 would also be located behind the wire 21 and held there against by the flap 18 as shown in FIG. 5. The stake 30 is preferably of extruded plastics material having the fastener ribs formed integral therewith or subsequently attaches as separate strips.

The claims defining the invention are as follows:

1. A plant guard for protecting a plant, seedling, bush, vine, or the like positioned therein attachable to a substantially horizontal support means comprising:

a sheet of material which is adapted to be formed into a tubular shape wherein said sheet has opposed ends and opposed marginal edges, said marginal edges being positioned adjacent to one another when said sheet of material is formed into a tubular shape;

fasteners disposed on said marginal edges; and a flap disposed at one end of said sheet wherein, when said sheet is formed in said tubular shape said flap is positioned adjacent said marginal edges, said flap being adapted to be folded over said support means, wherein said fasteners and said plant are disposed on opposing sides of said support means.

2. A plant guard according to claim 1 wherein said sheet is folded into a substantially triangular cross sectional shape.

3. A plant guard according to claim 1 wherein said sheet comprises a panel of extruded, synthetic plastic, hollow profile sheet having outer facing layers interconnected by a plurality of closely spaced, substantially parallel webs forming a series of elongate, internal channels or flutes extending along the opposed marginal edges of said sheet.

4. A plant guard according to claim 1 wherein said fasteners are interlockable resilient flexible strips secured to and extending along said marginal edges.

5. A plant guard according to claim 4 wherein said interlocking fasteners have locking profile ribs which releasably interlock with one another.

6. A plant guard according to claim 1 wherein at least one outwardly projecting flap is provided at the opposing end of said sheet, said projecting flap being hinged to said opposing end of said sheet so that, in use, said projecting flap provides support for said plant guard.

7. A plant guard according to claim 1 wherein said one end of said sheet has an upper edge, said upper edge having a cut-away portion which tapers downwardly from said upper edge to form a lateral opening in said plant guard.

8. A plant guard according to claim 1 wherein said fasteners include a stake means having cooperating fasteners whereby said marginal edges of said sheet are fastened to said stake means which is adapted to be engaged into the ground.

9. A plant guard for protecting a plant, seedling, bush, vine, or the like positioned therein attachable to a substantially horizontal support means comprising:

a sheet of material which is adapted to be formed into a tubular shape wherein said sheet has opposed ends and opposed marginal edges, said marginal edges being positioned adjacent to one another when said sheet of material is formed into a tubular shape, one end of said sheet having an upper edge, said upper edge having a cut-away portion which tapers downwardly from said upper edge to form a lateral opening in said plant guard;

fasteners disposed on said marginal edges; and a flap disposed at said one end of said sheet wherein, when said sheet is formed in said tubular shape said flap is positioned adjacent said marginal edges, said flap being adapted to be folded over said support means wherein said fasteners and said plant are disposed on opposing sides of said support means.

10. A plant guard comprising a sheet of material which is adapted to be formed into a tubular shape having a rear part and a front part, the sheet having opposed marginal side edges which, in the tubular shape, are adjacent, fastener means to fasten the marginal edges together, flap means at one of the sheet and adapted to be folded over a substantially horizontally extending support means, said flap means being provided on said rear part of the guard adjacent said marginal side edges of said sheet when in the tubular shape, with said marginal side edges and associated fastener means adapted to engage on said rear part of the guard, wherein the sheet has an upper marginal edge having a cut-away portion which tapers downwardly from the upper edge to form a lateral opening in the front of the guard.

* * * * *